US012573907B2

(12) United States Patent
Morino et al.

(10) Patent No.: US 12,573,907 B2
(45) Date of Patent: Mar. 10, 2026

(54) STATOR HAVING SLOTS FILLED WITH RESIN FOR INSULATION

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shintaro Morino, Osaka (JP); Yasushi Tamura, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 36 days.

(21) Appl. No.: 18/546,442

(22) PCT Filed: Feb. 14, 2022

(86) PCT No.: PCT/JP2022/005574
§ 371 (c)(1),
(2) Date: Aug. 15, 2023

(87) PCT Pub. No.: WO2022/176794
PCT Pub. Date: Aug. 25, 2022

(65) Prior Publication Data
US 2024/0186857 A1 Jun. 6, 2024

(30) Foreign Application Priority Data

Feb. 18, 2021 (JP) ................................. 2021-024027

(51) Int. Cl.
*H02K 3/34* (2006.01)
*H02K 1/16* (2006.01)
*H02K 3/30* (2006.01)

(52) U.S. Cl.
CPC ............... *H02K 3/345* (2013.01); *H02K 1/16* (2013.01); *H02K 3/30* (2013.01)

(58) Field of Classification Search
CPC ............. H02K 1/16; H02K 3/30; H02K 3/345
(Continued)

(56) References Cited

U.S. PATENT DOCUMENTS

2011/0258840 A1* 10/2011 Urano .................... H02K 1/148
29/596
2015/0021067 A1 1/2015 Muto et al.
(Continued)

FOREIGN PATENT DOCUMENTS

JP 2013-062911 A 4/2013
JP 2017-163797 A 9/2017
(Continued)

OTHER PUBLICATIONS

International Search Report, Application No. PCT/JP2022/005574, mailed Mar. 22, 2022. ISA/Japan Patent Office.

*Primary Examiner* — Rashad H Johnson
(74) *Attorney, Agent, or Firm* — Honigman LLP

(57) ABSTRACT

A stator includes a stator core and a coil. The stator core includes an annular yoke portion and a plurality of teeth that are annularly aligned. The plurality of teeth protrude from the yoke portion. Slots are constituted respectively by two adjacent teeth of the plurality of teeth. Insulating resin fills the slots of the stator. The coil includes a winding wire passed through the slots and wound around the teeth. The winding wire includes a core wire forming a conductive path and a covering portion covering the core wire. In each of the slots, the insulating resin completely fills a gap between an inner wall of the tooth and the covering portion.

6 Claims, 6 Drawing Sheets

(58) Field of Classification Search
USPC .......................................................... 310/179
See application file for complete search history.

(56)                     References Cited

U.S. PATENT DOCUMENTS

| | | | |
|---|---|---|---|
| 2019/0372421 A1* | 12/2019 | Amaya | H02K 5/08 |
| 2020/0006991 A1* | 1/2020 | Yamagata | H02K 1/04 |
| 2022/0393544 A1* | 12/2022 | Fujii | H02K 3/345 |
| 2022/0393550 A1* | 12/2022 | Fujii | H02K 21/02 |
| 2024/0186857 A1* | 6/2024 | Morino | H02K 1/16 |

FOREIGN PATENT DOCUMENTS

| JP | 2018-107921 A | 7/2018 |
|---|---|---|
| JP | 2020-033433 A | 3/2020 |

* cited by examiner

STATOR HAVING SLOTS FILLED WITH RESIN FOR INSULATION

CROSS-REFERENCE TO RELATED APPLICATIONS

This application is the U.S. national stage of PCT/JP2022/005574 filed on Feb. 14, 2022, which claims priority of Japanese Patent Application No. JP 2021-024027 filed on Feb. 18, 2021, the contents of which are incorporated herein.

TECHNICAL FIELD

The present disclosure relates to a stator.

BACKGROUND

JP 2020-33433A and JP 2013-62911A disclose stators. In these stators, a coil is fixed to a stator core via insulating paper.

In the above-described stators, it is desired to improve heat dissipation of the coil.

It is an object of the present disclosure to provide a technique capable of improving heat dissipation of a coil.

SUMMARY

A stator according to the present disclosure includes a stator core and a coil, the stator core including an annular yoke portion and a plurality of teeth that are aligned annularly, the plurality of teeth protruding from the yoke portion, slots being constituted respectively by two adjacent teeth of the plurality of teeth, and insulating resin filling the slots The coil includes a winding wire passed through the slots and wound around the teeth. The winding wire includes a core wire forming a conductive path and a covering portion covering the core wire. In each of the slots, the insulating resin completely fills a gap between an inner wall of the tooth and the covering portion.

Advantageous Effects

According to the present disclosure, the heat dissipation of the coil can be improved.

DETAILED DESCRIPTION OF PREFERRED EMBODIMENTS

In the following, embodiments of the present disclosure are listed and exemplified.

A stator including a stator core and a coil, the stator core including an annular yoke portion and a plurality of teeth that are aligned annularly, the plurality of teeth protruding from the yoke portion, slots being constituted respectively by two adjacent teeth of the plurality of teeth, and insulating resin filling the slots. The coil includes a winding wire passed through the slots and wound around the teeth. The winding wire includes a core wire forming a conductive path and a covering portion covering the core wire. In each of the slots, the insulating resin completely fills a gap between an inner wall of the tooth and the covering portion.

According to this configuration, in each of the slots, a gap between the inner wall of the tooth and the covering portion of the wiring wire is entirely filled with the insulating resin without interposing the insulating paper between the inner wall of the tooth and the covering portion of the wiring wire. Accordingly, it is possible to improve heat dissipation of the coil as compared with a stator having a configuration in which insulating paper is interposed between the inner wall of a tooth and the covering portion of a wiring wire.

The stator according to item [1], wherein the insulating resin completely fills a portion between an upper end and a lower end of each of the teeth.

According to this configuration, because the insulating resin fills a portion between the upper end and the lower end of each of the teeth completely, it is possible to further improve the heat dissipation of the coil. Furthermore, the coil can be more stably fixed in the slots.

The stator according to item [1] or [2], wherein, in each of the slots, an inner wall portion is entirely separated from the winding wire.

According to this configuration, insulation between the coil and the stator core can be more reliably ensured.

The stator according to any of items [1] to [3], wherein the covering portion is made of a low dielectric constant enamel.

According to this configuration, it is easy to reduce the thickness of the covering portion while more reliably ensuring insulation between the coil and the stator core, and thus it is easy to increase the thickness of the core wire. Accordingly, the performance of the motor can be easily improved.

First Embodiment

Figure 2:
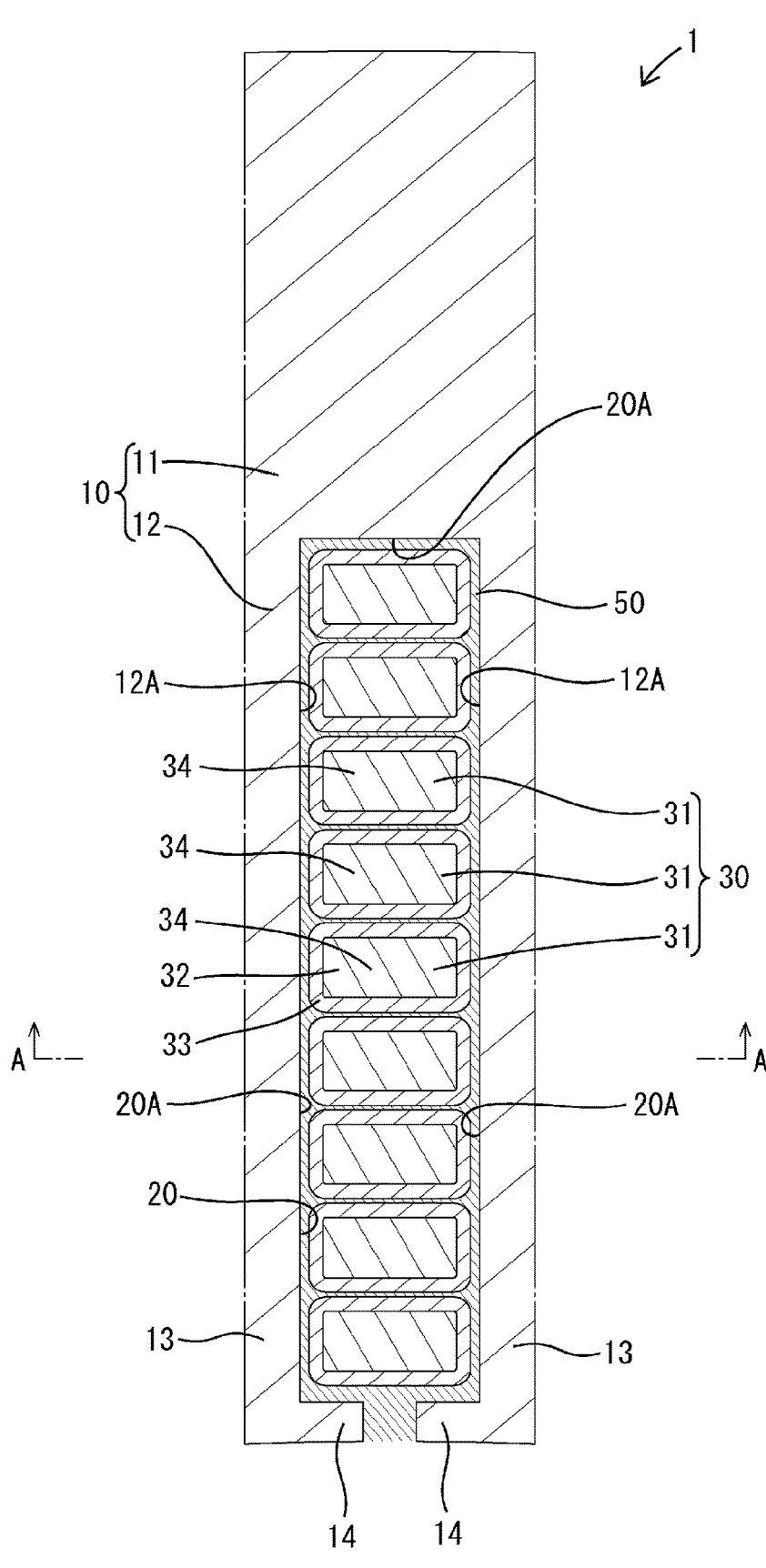
FIG. 2 is a cross-sectional view around a coil disposed in a slot.

A stator 1 according to a first embodiment is used as a component of a rotary electric machine (specifically, a motor). As shown in FIG. 2, the stator 1 includes a stator core 10, a coil 30, and an insulating resin 5. Hereinafter, the radial direction of the stator 1 will be referred to as "radial direction", the axial direction of the stator 1 will be referred to as "axial direction", and the circumferential direction of the stator 1 will be referred to as "circumferential direction".

Figure 1:
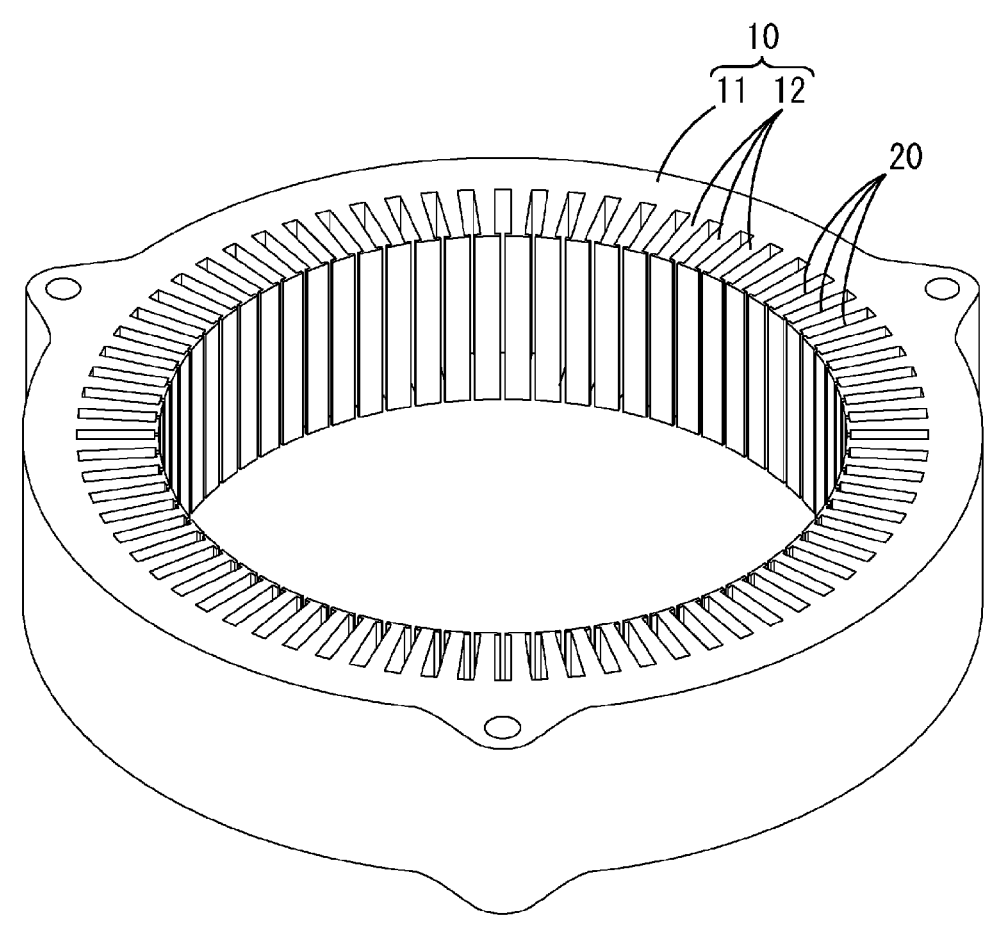
FIG. 1 is a perspective view of a stator core according to a first embodiment.

As shown in FIG. 1, the stator core 10 includes a yoke portion 11 and a plurality of teeth 1. The yoke portion 11 has a ring shape, more specifically, a circular ring shape. The teeth 12 are arranged annularly along the inner circumferential surface of the yoke portion 1. The teeth 12 are arranged at intervals in the circumferential direction. The teeth 12 protrude radially inward from the inner circumferential surface of the yoke portion 1. The teeth 12 each have a wall shape extending in the radial direction and the axial direction. The teeth 12 each include a body 13 having a wall shape extending along the radial direction and the axial direction, and protrusions 14 protruding from a distal end (in other words, an end on the inner side in the radial direction) of the body 13 to both sides in the circumferential direction.

The stator core 10 may be, for example, a stacked steel sheet that is manufactured by stacking a plurality of electromagnetic steel sheets (for example, silicon steel sheets) in a thickness direction, or may also be a powder magnetic core configured by press-molding magnetic particles that are coated with an insulating material.

As shown in FIG. 1, slots 20 are each formed by two adjacent teeth 1. Both sides of each of the slots 20 in the circumferential direction are defined by the teeth 12, and an outer surface of each of the slots 20 in the radial direction is defined by the yoke portion 1. The slots 20 are open to both surfaces of the stator 1 in the axial direction and an inner surface of the stator 1 in the radial direction.

The coil 30 may be a distributed winding coil, or may also be a concentrated winding coil. As shown in FIG. 2, the coil 30 has a winding wire 31 passed through the slots 20 and wound around the teeth 1. The winding wire 31 includes a core wire 32 forming a conductive path and a covering portion 33 covering the core wire 3. The core wire 32 is made of a conductor. The covering portion 33 forms an insulating layer. The material of the covering portion 33 is not limited to a specific material. In the present embodiment, the covering portion 33 is made of a low dielectric constant enamel having a low dielectric constant. The main component of the covering portion 33 may be a thermosetting resin such as polyvinyl formal, thermosetting polyurethane, thermosetting acrylic, epoxy, thermosetting polyester, thermosetting polyesterimide, aromatic polyamide, thermosetting polyamide-imide, or thermosetting polyimide. The main component of the covering portion 33 may also be a thermoplastic resin such as polyetherimide, polyphenylene ether, polyethersulfone, polyp henylene sulfide, polyetheretherketone, or thermoplastic polyimide. Here, the "main component" of the material is the component having the largest content, for example, a component contained in an amount of at least 50% by mass in the material.

As shown in FIG. 2, the slots 20 are filled with insulating resin 5. The method for filling the insulating resin 50 in the slots 20 is not limited to a specific method. The method for filling the insulating resin 50 in the slots 20 is transfer molding, for example. The insulating resin is not limited to a specific resin. Preferred examples of the insulating resins include epoxy resins, PBT resins, PET resins, PPS resins, SPS resins, m-PPE resins, nylon resins (PA6, PA46, PA66), aromatic nylon resins (PA4T, PA6T, PA9T, PA10T), and LCP resins.

Figure 3:
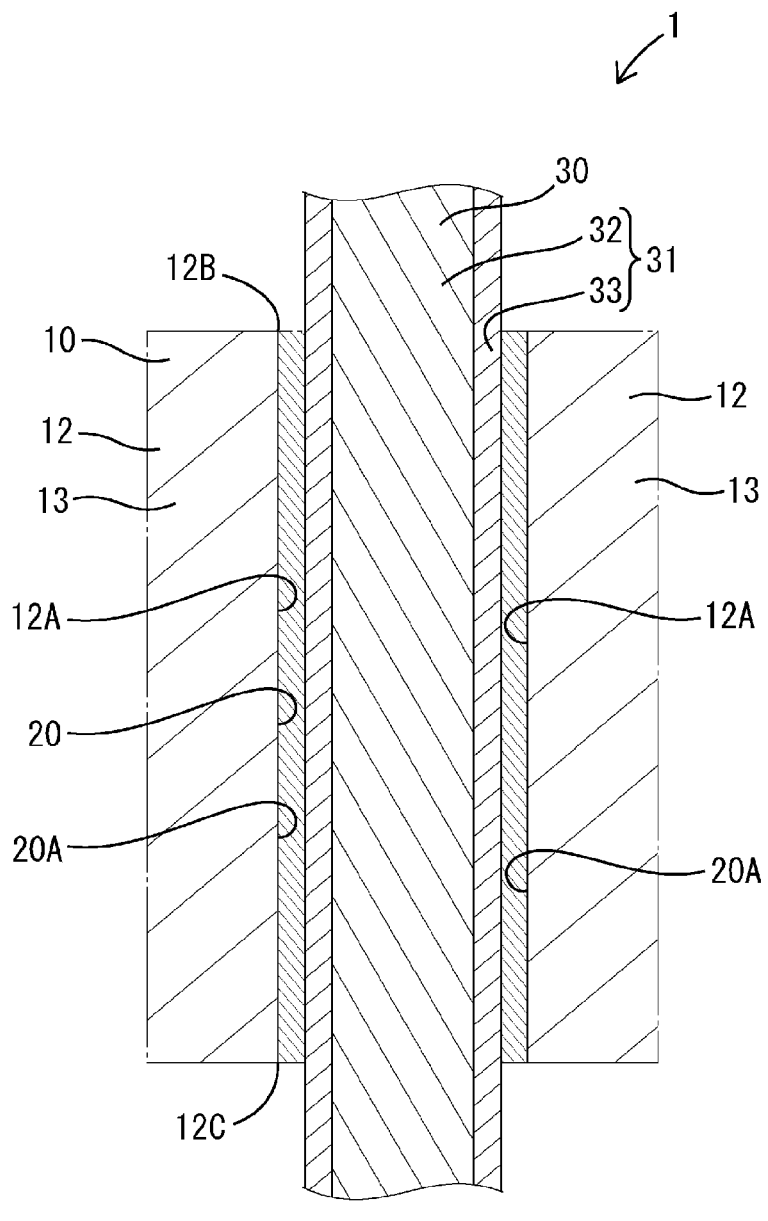
FIG. 3 is a cross-sectional view taken along line A-A in FIG. 2.

As shown in FIGS. 2 and 3, in each of the slots 20, the gap between the inner wall 12A of the tooth portion 12 and the covering portion 33 of the winding wire 31 is entirely filled with the insulating resin 5. Accordingly, in each of the slots 20 of the stator 1, the gap between the inner wall 12A of the tooth 12 and the covering portion 33 is entirely filled with the insulating resins 50, without any insulating paper interposed between the inner wall 12A of the tooth 12 and the covering portion 3. With this configuration, the stator 1 can improve heat dissipation of the coil 30, as compared with a stator having a configuration in which insulating paper is interposed between the inner wall of a tooth and the covering portion of a winding wire. In a configuration in which varnish is permeated into insulating paper, for example, an air layer is likely to be formed, and the heat dissipation of the coil is likely to be reduced. On the other hand, in the stator 1, it is possible to solve the problem that the heat dissipation of the coil 30 is reduced. In each of the slots 20, the winding wire 31 has a plurality of insertion portions 34 disposed in the slot 2. The insertion portions 34 each include the above-described core wire 32 and the covering portion 3. The plurality of insertion portions 34 are arranged side by side in the radial direction. The insulating resin 50 also fills gaps between two adjacent insertion portions 34 in the slots 20 completely. Accordingly, it is easy to improve the heat dissipation of the gaps between adjacent insertion portions 34 in the slots 2.

Furthermore, as shown in FIG. 3, in each of the teeth 12, the insulating resin 50 fills the portion between the upper end 12B and the lower end 12C completely. With this configuration, in the stator 1, it is possible to further improve heat dissipation of the coil 3. Furthermore, the coil 30 can be more stably fixed in the slots 2.

Furthermore, as shown in FIGS. 2 and 3, in each of the slots 20, the inner wall portion 20A of the slot 20 is entirely separated from the winding wire 3. With this configuration, in the stator 1, it is possible to more reliably ensure insulation between the coil 30 and the stator core 1.

Furthermore, the covering portion 33 is made of a low dielectric constant enamel. Accordingly, in the stator 1, the insulation between the coil 30 and the stator core 10 is more reliably ensured, the thickness of the covering portion 33 is easily reduced, and thus the core wire 32 can be thickened. That is to say, it is possible to improve a space factor of the core wire 32, which is the ratio that the core wire 32 occupies within the slots 2. Accordingly, the performance of the motor (for example, torque) can be easily improved. In addition, insulation can be ensured by the covering portion 33 alone. That is to say, by filling the slots 20 completely with the insulating resin 50, the heat dissipation can be improved, and the insulation can be ensured by the covering portion 33, which is made of low dielectric constant enamel.

As described above, in each of the slots 20 of the stator 1, the insulating resin 50 completely fills the gap between the inner wall 12A of the tooth 12 and the covering portion 33, without any insulating paper interposed therebetween, thereby improving heat dissipation of the coil 3. However, in a configuration in which the insulating paper is not interposed between the inner wall 12A of the tooth 12 and the covering portion 33, a problem is the insulation of the winding wire 3. To solve this problem, the covering portion 33 is made of a low dielectric constant enamel. As a result, insulation can be ensured by the winding wire 31 alone. The insulation can be ensured, for example, even if the winding wire 31 is close to the inner wall 12A of the tooth 12 or comes into contact with the inner wall 12A of the tooth 1. That is to say, in the stator 1, by entirely filling the slots with the insulating resin 50 without providing insulating papers, the heat dissipation can be improved, and the insulation can be more reliably ensured by the covering portion 33, which is made of low dielectric constant enamel.

Hereinafter, specific effects obtained by improving the heat dissipation of the coil 30 will be exemplified.

Figure 4:
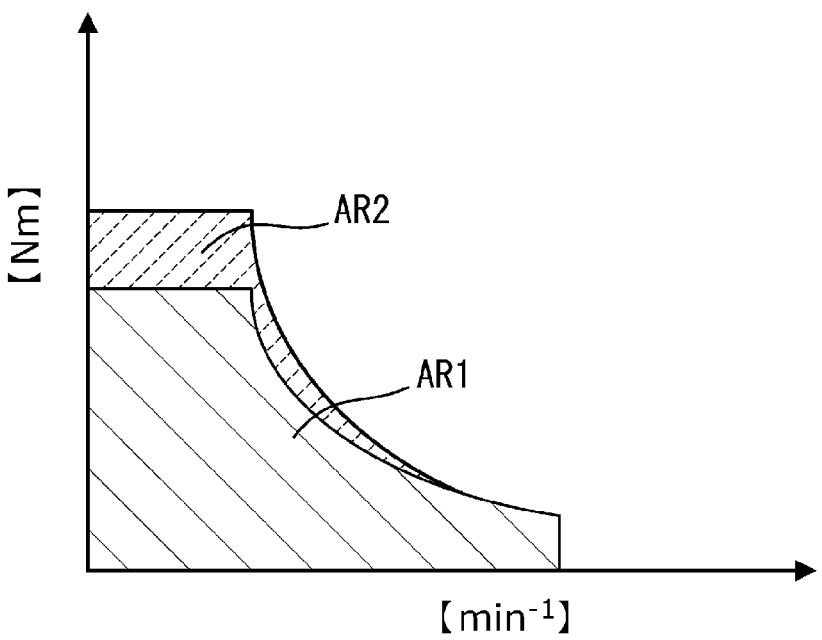
FIG. 4 is a graph illustrating that the maximum torque of a motor can be increased with the stator core according to the first embodiment.

When a current flows through the coil 30, the core wire 32 generates heat. The upper limit of the current flowing through the core wire 32 is determined based on the upper limit of the allowable range of the temperature of the core wire 3. As described above, because the heat dissipation is improved in the stator 1, the upper limit of the current flowing through the core wire 32 is increased. That is to say, in the stator 1, the upper limit of the current flowing through the core wire 32 can be increased without changing the size of the stator 1. Also, the maximum torque of the motor is proportional to the current flowing through the coil 3. As a result, in the stator 1, it is possible to increase the maximum torque of the motor to which the stator 1 is applied. As shown in FIG. 4, for example, the maximum torque can be increased by an amount corresponding to the second region AR2, as compared with the first region AR1, which corresponds to a stator provided with insulating paper.

Figure 5:
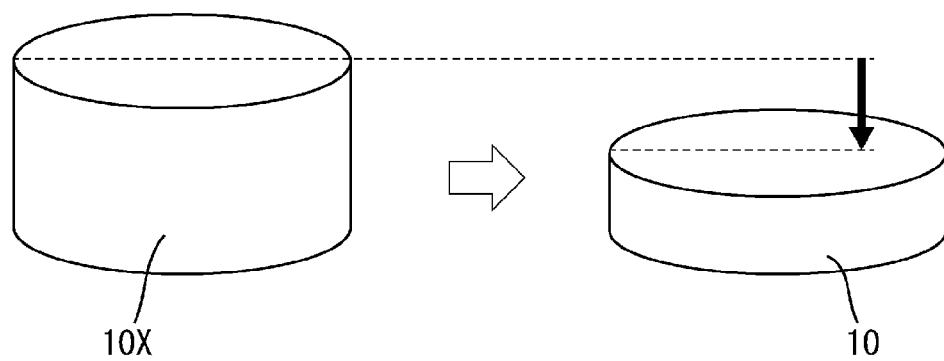
FIG. 5 is a diagram illustrating that the thickness of the stator core can be reduced with the stator core according to the first embodiment.

Alternatively, in the stator 1, the stacking thickness (length in the axial direction) of the stator core 10 can be reduced without changing the maximum torque of the motor to which the stator 1 is applied. The stacking thickness of the stator core 10 is proportional to the maximum torque of a motor to which the stator 1 is applied. In other words, the stacking thickness of the stator core 10 can be reduced without changing the maximum torque of the motor. As shown in FIG. 5, for example, as compared with a stator core 10X of a stator provided with insulating paper, it is possible to reduce the stacking thickness (length in the axial direction) of the stator core 10 while keeping the maximum torque of the motor. Because the stacking thickness of the stator core 10 is reduced, the amount of material used is reduced, and thus the material cost is reduced. Here, in FIG. 5, the stator core 10 and the stator core 10X are schematically illustrated.

Figure 6:
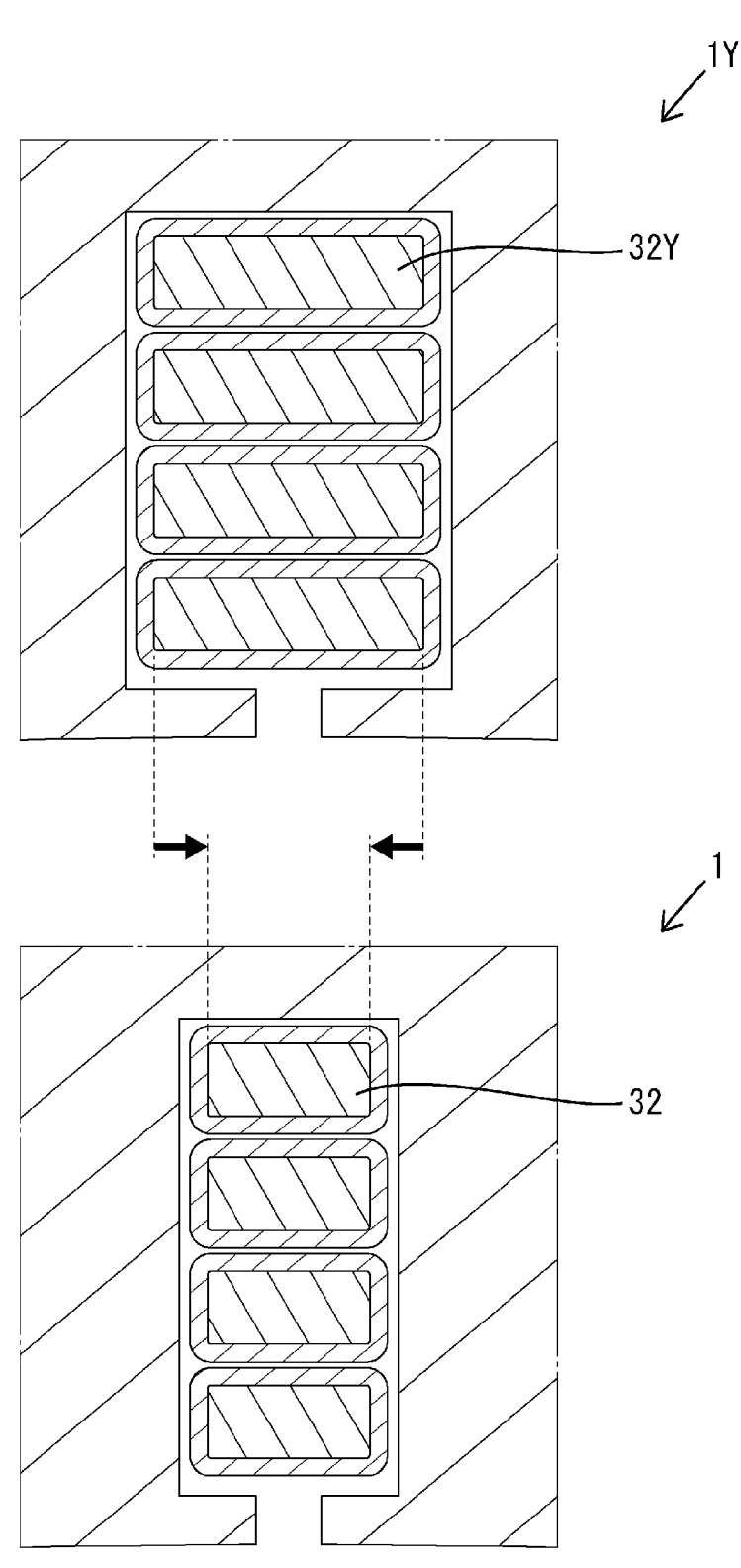
FIG. 6 is a diagram illustrating that the cross-sectional area of the core wire can be reduced with the stator core according to the first embodiment.

Alternatively, in the stator 1, the cross-sectional area of the core wire 32 can be reduced without changing the maximum torque of the motor and the stacking thickness (length in the axial direction) of the stator core 1. The current flowing through the core wire 32 is proportional to the cross-sectional area of the core wire 3. That is to say, it is possible to reduce the cross-sectional area of the core wire 32 without changing the current flowing through the core wire 32 (the maximum torque of the motor) and the stacking thickness (length in the axial length) of the stator core 1. As shown in FIG. 6, for example, the core wire 32 of the stator 1 can be made narrower (length in the circumferential direction) than the core wire 32Y of the stator 1Y provided with insulating paper (not shown). As a result, the amount of the material used for the core wire 32 can be reduced, and thus the material cost is reduced. Furthermore, as shown in FIG. 6, in a configuration in which the cross-sectional area of the core wire 32 is reduced, even if the thickness (length in the circumferential direction) of the teeth 12 is increased, if the material cost per unit volume of the teeth 12 is less expensive than that of the core wire 32, the material cost is reduced as a whole.

Figure 7:
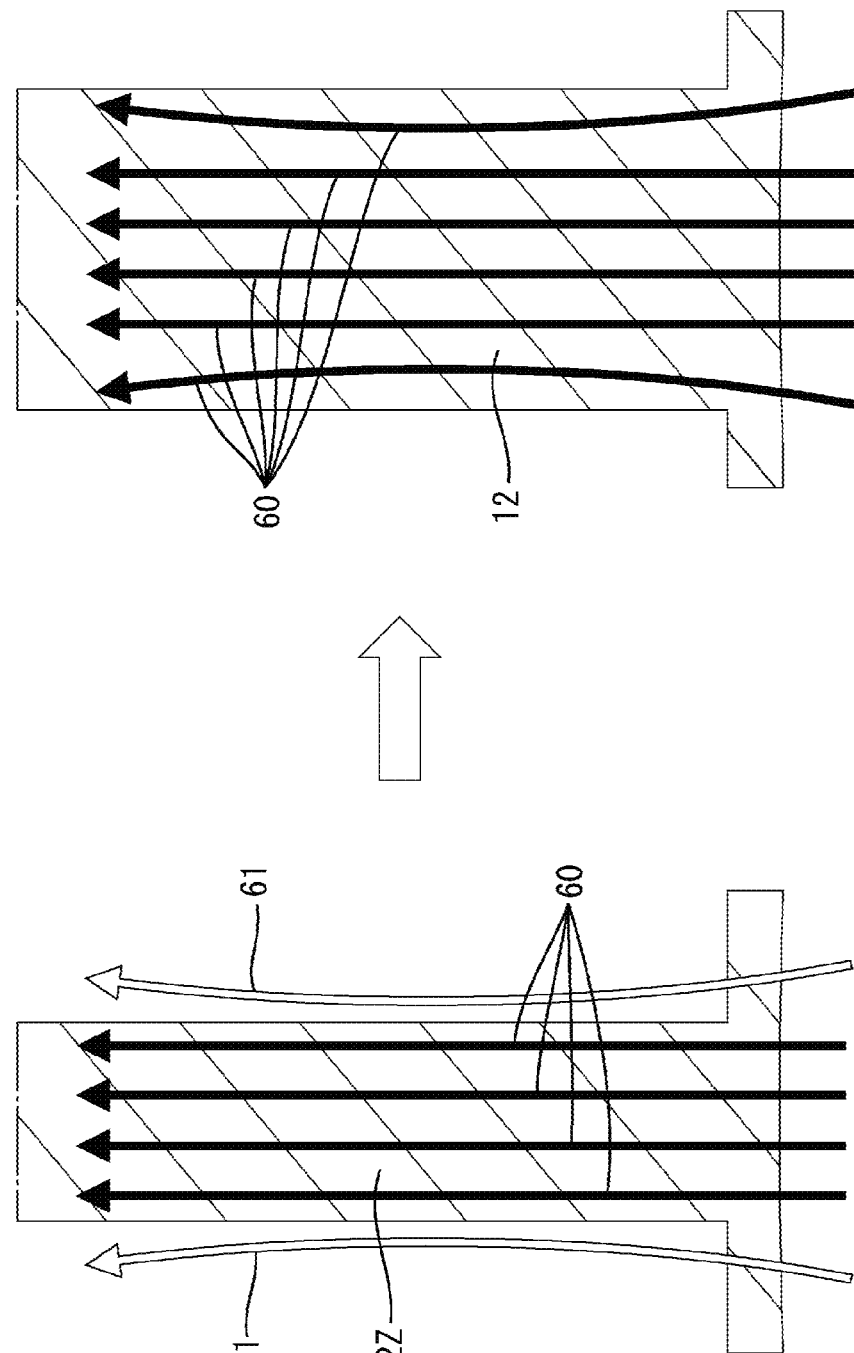
FIG. 7 is a diagram illustrating that the effective magnetic flux can be increased with the stator core according to the first embodiment.

When the thickness of the teeth 12 is increased, the following effects can be produced. As shown in FIG. 7, as compared with the effective magnetic flux 60 portion 12Z where the leakage magnetic flux 61 is generated, the effective magnetic flux 60 is increased by increasing the thicknesses (lengths in the circumferential direction) of the teeth 1. The maximum torque of a motor is proportional to the effective magnetic flux. Therefore, according to this configuration, it is possible to increase the maximum torque of a motor to which the stator 1 is applied.

Other Embodiments

The present disclosure is not limited to the embodiments illustrated by the above description and drawings. The features of the above-described embodiments can be combined in any manner, as long as no contradiction arises, for example. Also, any feature of the above-described embodiments may also be omitted if not explicitly indicated as essential.

The embodiment disclosed here is to be considered in all respects as illustrative and not limiting. The scope of the present disclosure is not limited to the embodiments disclosed herein, and is intended to include all modifications within the scope indicated by the claims or within the scope equivalent to the claims.

The invention claimed is:
1. A stator comprising:
a stator core; and
a coil,
the stator core including:
   an annular yoke portion; and
   a plurality of teeth that are aligned annularly,
the plurality of teeth protruding from the yoke portion,
slots being constituted respectively by two adjacent teeth
   of the plurality of teeth, and insulating resin filling the
   slots,
wherein the coil includes a winding wire passed through
   the slots and wound around the teeth,
the winding wire includes:
   a core wire forming a conductive path; and
   a covering portion covering the core wire, and
in each of the slots,
the insulating resin completely fills a gap between an
   inner wall of the tooth and the covering portion entirely,
   and
the insulating resin also completely fills a gap between
   two adjacent insertion portions, and
a distance between the two adjacent insertion portions is
   smaller than the thickness of the covering portion.

2. The stator according to claim 1, wherein the insulating resin completely fills a portion between an upper end and a lower end of each of the teeth.

3. The stator according to claim 2, wherein the covering portion is made of a low dielectric constant enamel.

4. The stator according to claim 1, wherein, in each of the slots, an inner wall portion is entirely separated from the winding wire.

5. The stator according to claim 4, wherein the covering portion is made of a low dielectric constant enamel.

6. The stator according to claim 1, wherein the covering portion is made of a low dielectric constant enamel.

* * * * *